United States Patent [19]
Sauer

[11] Patent Number: 5,620,209
[45] Date of Patent: Apr. 15, 1997

[54] DEVICE FOR CLAMPING A HOSE END SECTION FITTED ONTO A PIPE END SECTION

[75] Inventor: Heinz Sauer, Ronneburg, Germany

[73] Assignee: Rasmussen GmbH, Maintal, Germany

[21] Appl. No.: 597,074

[22] Filed: Feb. 5, 1996

[30] Foreign Application Priority Data

Feb. 22, 1995 [DE] Germany .................. 195 06 144.6

[51] Int. Cl.[6] .............. B65D 63/02; F16L 33/20
[52] U.S. Cl. .............. 285/23; 285/915; 285/242; 285/252; 24/20 S; 24/20 R
[58] Field of Search .............. 285/23, 242, 252, 285/253, 915; 24/20 R, 20 S, 20 TT

[56] References Cited

U.S. PATENT DOCUMENTS

| | | | |
|---|---|---|---|
| 3,365,218 | 1/1968 | Denyes | 285/253 |
| 4,135,744 | 1/1979 | Fouts | 285/253 |
| 4,858,279 | 8/1989 | Kato et al. | 24/20 S |
| 4,882,814 | 11/1989 | Takahashi | 285/242 |
| 4,951,363 | 8/1990 | Takahashi et al. | 24/20 R |
| 5,002,094 | 3/1991 | Brovont | 285/252 |
| 5,145,218 | 9/1992 | Worley | 285/243 |
| 5,185,913 | 2/1993 | Campo et al. | 285/253 |
| 5,234,233 | 8/1993 | Fix | 285/23 |
| 5,388,321 | 2/1995 | Farrell | 285/23 |
| 5,405,170 | 4/1995 | Roulinson et al. | 285/23 |
| 5,456,784 | 10/1995 | Cogdill et al. | 285/252 |

FOREIGN PATENT DOCUMENTS

| | | | |
|---|---|---|---|
| 2630808 | 11/1989 | France | 285/23 |
| 3543717 | 6/1987 | Germany . | |
| 3727908 | 3/1988 | Germany . | |
| 4305649 | 9/1994 | Germany . | |

*Primary Examiner*—Eric K. Nicholson
*Attorney, Agent, or Firm*—Darby & Darby

[57] ABSTRACT

A device for clamping a hose end section that is fitted onto a pipe end section includes a hose clamp surrounding a hose end section. The hose clamp has overlapping end sections, each of which has an approximately radially outwardly extending tensioning jaw. A securing ring is fixed to the hose end section and has a radial projection. The securing ring surrounds the hose end section and is disposed between the hose end and the hose clamp. The securing ring is joined to the hose clamp in an area diametrically opposite to the area of overlap of the end sections of the hose clamp. The securing ring has a recess disposed in a radial projection. An approximately U-shaped clip has a cross-piece and a pair of legs depending from the cross-piece. The U-shaped clip is disposed such that, in the tensioned state, the legs of the clip overlap the tensioning jaws of each of the end sections. The U-shaped clip has a hook depending from the cross-piece that is radially engaged in the recess. In a further embodiment, the securing ring is not utilized and the cross-piece has an edge extending in the peripheral direction of the hose clamp. The edge is disposed on the free end side of the cross-piece and has a supporting arm depending from the edge such that, in the tensioned state, the supporting arm rests on the hose.

14 Claims, 2 Drawing Sheets

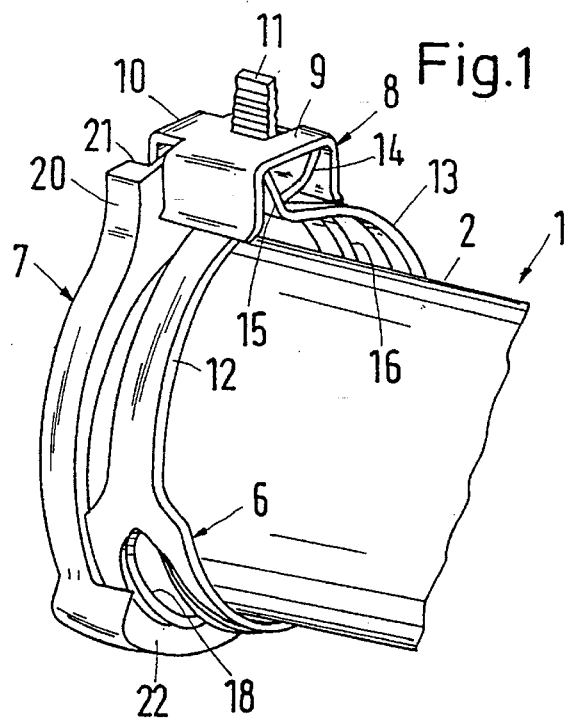
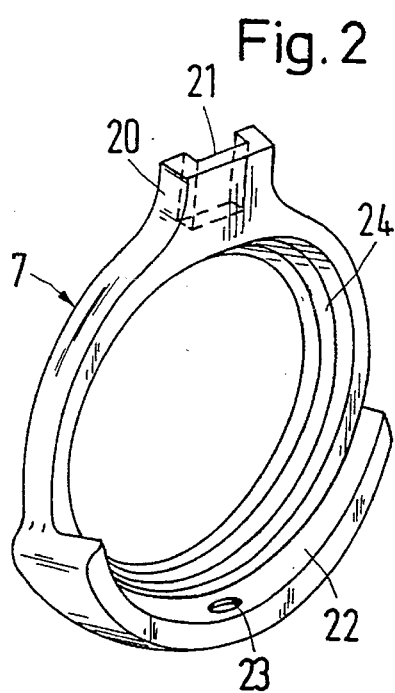
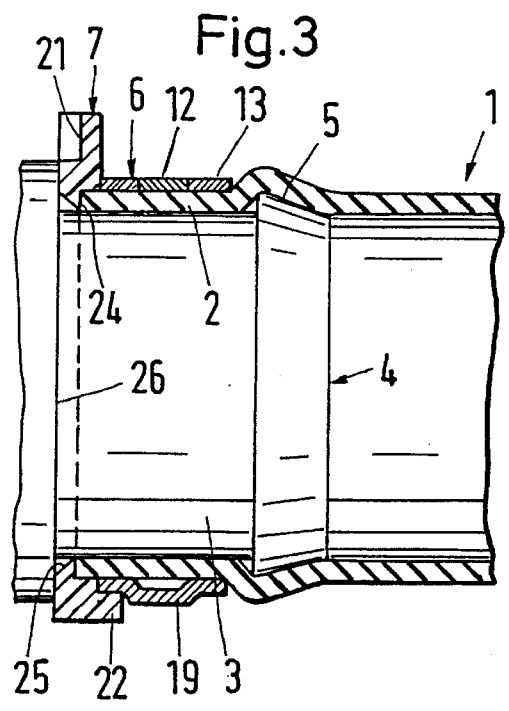
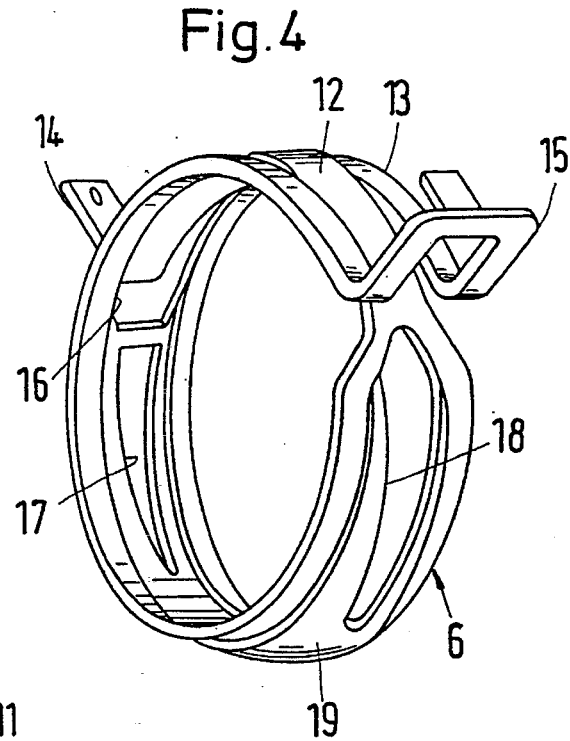
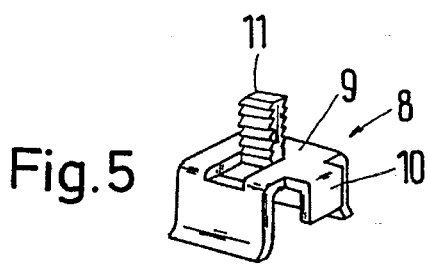

DEVICE FOR CLAMPING A HOSE END SECTION FITTED ONTO A PIPE END SECTION

BACKGROUND OF THE INVENTION

1. Field of the Invention

The present invention relates to a device for clamping a hose end section that is fitted onto a pipe end section. More specifically, the present invention relates to a spring hose clamp that surrounds the hose end section. The internal diameter of the clamp, in a non-tensioned state, is smaller than the internal diameter of the clamp in a tensioned state, and is smaller than the external diameter of the hose. A securing ring, made from an elastomer material, is fixed in a materially locked manner to the hose end section. The securing ring surrounds the hose end section between the hose end and the clamp and is joined to the clamp in an area that is diametrically opposite to an area of overlap of end sections of the hose clamp. The end sections of the hose clamp each have approximately radially outwardly projecting tensioning jaws.

2. Discussion of the Related Art

Devices for clamping a hose end section to a pipe end section are known, for example, from German Reference DE 35 43 717 A1. This German reference discloses a spring band hose clamp that is vulcanized to the hose in an area that is disposed diametrically opposite to the area of overlap of its end sections. A securing ring is also vulcanized to the hose between the hose clamp and the free end of the hose (FIG. 3F). The hose is delivered from the manufacturer in this preassembled state and is then fitted by means of a robot onto a pipe end section. The pipe end section can be, for example, a pipe-like connection piece of a motor vehicle, which has a retaining rib. The tensioning jaws of the hose clamp are pressed together by means of pliers to radially expand the hose clamp. After the hose has been fitted onto the end section of the pipe, the tensioning jaws of the hose clamp are released so that the hose clamp contracts by means of its own spring force, and clamps the hose tightly onto the pipe end section.

When the hose is fitted onto the pipe end section, the tensioning jaws of the hose clamp can, despite the use of a securing ring, tilt in an axial direction with respect to the longitudinal axis of the pipe end section. When the tensioning jaws are released there is the risk that the hose clamp will adopt the tilted position resulting in the hose clamp lying in a plane that is not perpendicular with respect to the longitudinal axis. Thus, the tilting of the hose clamp may result in a leak between the pipe end section and the hose. Such a tilting of the hose clamp can also occur during transportation of the preassembled unit (i.e., during shipment of the hose, hose clamp and securing ring). For example, handling of the preassembled units when they are pulled out of a stack may cause the hose clamps to catch on one another. It is even possible to separate the joint between the hose and hose clamp. This is particularly true when the hose clamp is coated with an anti-corrosion layer, such as wax.

It is, therefore, an object of the present invention to provide a device for clamping a hose end section that is fitted onto a pipe end section such that, in the preassembled state, the hose clamp is more firmly fixed to the hose.

SUMMARY OF THE INVENTION

In accordance with a preferred embodiment demonstrating further objects, features and advantages of the present invention, a securing ring has a recess that is radially engaged by a hook of a cross-piece of an approximately U-shaped clip. The U-shaped clip overlaps the tensioned tensioning jaws of a spring hose clamp. In this structural arrangement, the hose clamp is fixed to the hose at two positions, which are disposed diametrically opposite to one another. The radially outwardly projecting tensioning jaws of the clamp are substantially covered by the U-shaped clip and are not directly accessible when the hose clamp is tensioned. In this tensioned (and radially expanded) state, the clip is prevented from being displaced in the axial direction by external axial forces because the clip is connected to the securing ring in a form locking manner. The joint between the clip and the securing ring can only be undone by radially removing the clip from the tensioning jaws. After the hose has been fitted onto the pipe end section and the clip has been removed from the tensioning jaws, the hose clamp partly relaxes and clamps the hose onto the pipe end section. The hose clamp then adopts the desired or preferred position. In other words, the hose clamp lies in a plane that is perpendicular with respect to both the longitudinal axis of the hose and to the longitudinal axis of the pipe end section.

The connection between the securing ring and the hose clamp, in the area diametrically opposite the area of overlap, is preferably releasable. Thus, the securing ring together with the hose clamp can be easily removed from the hose after the connection has been released. The releasable connection can be effected by using an adhesive that melts at a temperature above its hardening temperature. These high temperatures are often reached when, for example, the hose is used to clamp a cooling water hose in a motor vehicle. Thus, during use, if a repair to either the hose clamp or the securing ring is required, the hose clamp and securing ring can be removed from the hose, without requiring an additional step to separate the hose clamp and securing ring from the hose. Nevertheless, the hose clamp and securing ring according to the present invention remain form-locked (i.e. interlocked) to the hose and/or pipe during normal use as they surround both the hose and pipe completely.

In a preferred embodiment, a cyanoacrylate adhesive is particularly suitable for use as the adhesive. This type of adhesive hardens very quickly to form a high molecular, non-crosslinked polymer. The ambient moisture or the moisture on the surface of the substrates to be adhered is normally sufficient to trigger polymerization. However, a cyanoacrylate adhesive softens at a temperature of over 80° C. After softening, the cyanoacrylate adhesive does not re-harden when the temperature drops below 80° C. again. Thus, the adhesive connection between the securing ring and the hose clamp is released.

In a preferred embodiment, the securing ring overlaps the hose clamp with an axial securing part in the area diametrically opposite the area where the end sections of the hose clamp overlap. The releasable connection between the securing ring and the hose clamp is effected between the axial securing part of the securing ring and the hose clamp. The releasable connection can be in addition to the materially locking connection or to the formlocking connection.

The hose clamp has longitudinal slits that extend in the peripheral direction. The securing part engages in at least one longitudinal slit in the hose clamp. Additionally or alternatively, the securing part can grip behind the hose clamp by means of a radial projection. Consequently, the securing ring can be provided with a flange that projects radially inwardly, and which is joined in a material locking manner with the end face of the hose end section. This material locked joint can be effected by means of an adhesive, such as a cyanoacrylate adhesive. Thus, the securing ring is not only securely fixed to the hose, but at the same time also protects the axial free end face of the hose end section from being penetrated by aggressive fluids, such as may occur if the hose end section is provided with a woven insert as is conventionally done.

The present invention relates to a further device for clamping a hose end section that is fitted onto a pipe end section. The device has a spring hose clamp surrounding the hose end section. The internal diameter of the clamp, in a non-tensioned state, is smaller than an internal diameter of the clamp in a tensioned state, and is smaller than the external diameter of the hose. The hose clamp is joined to the hose in a materially locking manner in an area which is disposed diametrically opposite to an area of overlap of two end sections of the hose clamp. The two end sections are each provided with radially outwardly projecting tensioning jaws. The device has an approximately U-shaped clip which overlaps the tensioning jaws in the tensioned state.

The device is preassembled in the form of a "spring-band hose clamp" onto the hose, and is maintained in the tensioned state by the U-shaped clip. The material locking joint is preferably formed by use of an adhesive. A securing ring is not utilized in this further device.

With this further device, there is the risk that the hose clamp can become tilted with respected to the longitudinal axis of the hose and the risk that the hose clamp can become separated from the hose either during handling or when the hose, together with the premounted hose clamp, is fitted onto the pipe end section. Thus, it is an object of the present invention to provide a firmer hold of the hose clamp, in the preassembled state, on the hose.

This object is achieved by providing at least one of the peripherally extending edges of the cross-piece of the clip with a supporting arm that, when the hose clamp is tensioned, rests on the hose. In a preferred embodiment, at least the peripherally extending edge of the cross-piece that is disposed closer to the free axial end of the hose is provided with a supporting arm. The supporting arm prevents tilting of the hose clamp during transportation of the preassembled unit and during mounting of the hose end section onto the pipe end section. The supporting arm is preferably joined, in a materially locked manner to the hose. Thus, a firmer hold of the hose clamp on the hose is achieved.

The materially locking joint of this embodiment can also be effected by using an adhesive that melts at a temperature above its hardening temperature. In a preferred embodiment, the adhesive is a cyanoacrylate adhesive. While the joint between the supporting arm and the hose can easily be separated when the clip is removed from the tensioning jaws of the hose clamp, the joint between the hose and hose clamp is automatically released as soon as the temperature increases above the hardening temperature. The hose clamp can thereafter be easily removed from the hose, if necessary, to replace either the hose or the hose clamp.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a perspective view of a hose end section with a hose clamp, securing ring and clip mounted about the hose;

FIG. 2 is a perspective view of the securing ring;

FIG. 3 is an axial cross-sectional view through the end section of the hose after the clip has been removed and the tension on the hose clamp has been partially removed;

FIG. 4 is a perspective view of the hose clamp;

FIG. 5 is a perspective view of the clip; and

DETAILED DESCRIPTION OF THE PREFERRED EMBODIMENTS

Figure 6:
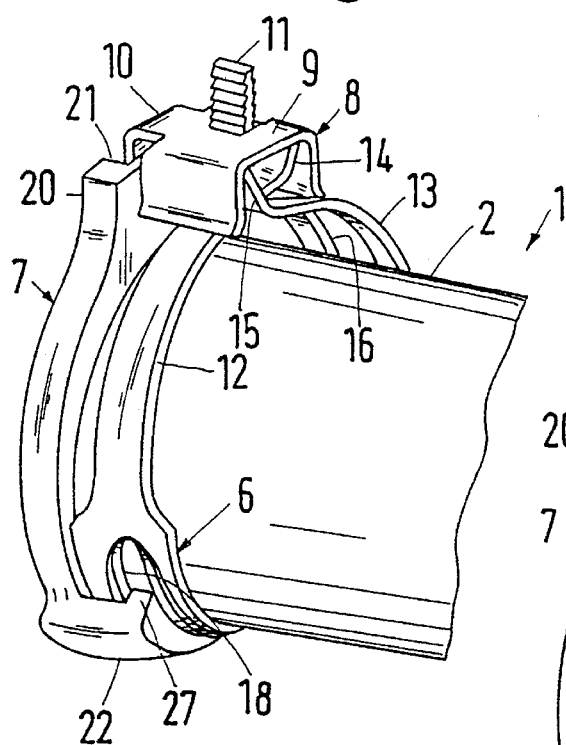
FIGS. 6, 7 and 8 are perspective views of various embodiments of the device according to the present invention.

Referring now to FIGS. 1–5, a device for clamping an end section 2 of a hose 1 onto the end section 3 of a pipe 4, is illustrated. Pipe 4 is provided with a retaining rib 5. The device comprises a spring band hose clamp 6 that surrounds hose end section 2. In a non-tensioned state, the internal diameter of the clamp 6 is smaller than the internal diameter of the clamp in a tensioned state and smaller than the external diameter of the hose 1. The device also includes a securing ring 7 that surrounds the hose end section 2 and is disposed between the hose end and the hose clamp 6. Ring 7 is fitted, in a materially locked manner, to the hose end section. Ring 7 is preferably made from an elastomer material. In a preferred embodiment, ring 7 is made from a thermoplastic elastomer, for example, an EPDM or an olefine-dieneterpolymer.

The device also includes an approximately U-shaped clip 8. Clip 8 has a crosspiece 9 with an axially and radially inwardly extending hook 10, which depends from crosspiece 9. Clip 8 also includes a radially outwardly extending ribbed tongue 11.

Hose clamp 6 has end sections 12, 13, which overlap in the peripheral direction. Each end section 12, 13 has an approximately radially outwardly directed tensioning jaw 14, 15, respectively. Clamp 6 has slits 16, 17, 18, which each extend in the peripheral direction. End section 12 passes through slit 16. Area 19 of clamp 6 is disposed diametrically opposite of the area where end sections 12, 13 overlap. Area 19 has no slit. U.S. Pat. No. 4,969,240 discloses a hose clamp, per sé, and the disclosure of this patent is hereby incorporated by reference.

Securing ring 7 has a radially outwardly extending projection 20. Projection 20 has a recess 21. Ring 7 has a securing part 22 disposed diametrically opposite to projection 20. Securing part 22 extends axially and in the peripheral direction. Securing part 22 has an indentation 23 disposed on its internal cylindrical surface. The internal diameter of the securing ring 7 is stepped as can be seen in FIGS. 2 and 3. Further, securing ring 7 has a radially inwardly protruding flange 24. Flange 24 has a sloping axial end face 25, which faces away from the stepped portion of ring 7 (see FIG. 3).

In a preferred embodiment, parts 6, 7 and 8, are preassembled onto end section 2 of hose 1 as described below. Indentation 23, disposed on the internal cylindrical surface of securing part 22, is filled with a cyanoacrylate adhesive. The axial internal surface of flange 24 and the inner peripheral surface of securing ring 7 that is disposed adjacent to flange 24, are both coated with a cyanoacrylate adhesive. The axial end face and the area of the outer cylindrical surface of hose 1 that will come into contact with the internal surface of the securing ring 7 are coated with a cyanoacrylate adhesive. Hose clamp 6 is glued, in area 19, to the internal surface of the securing part 22. A tool is used to move the tensioning jaws 14 and 15 of the hose clamp 6 towards each other, to the position illustrated in FIG. 1. Hose clamp 6 is now expanded and tensioned counter to its spring force. In other words, the hose clamp is in a tensioned state. Once in this position, clip 8 is placed over the tensioning jaws 14 and 15, as shown in FIG. 1, so that hook 10 engages in recess 21 of projection 20. The tool which has been applying tension to the hose clamp 6 can now be removed because clip 8 keeps the hose clamp 6 tensioned. Securing ring 7 and hose clamp 6 are then fitted together on the end section 2 of hose 1 and securing ring 7 is glued to the end of the hose. In this position, essentially only area 19 of the hose clamp contacts end section 2 of hose 1.

Hose 1 and parts 6, 7 and 8 are now in a preassembled state and are ready to be fitted onto the end section 3 of pipe 4. Hose 1 and parts 6, 7 and 8 are fitted over retaining rib 5 and are moved axially until hose end section 2 abuts a shoulder 26 (see FIG. 3). Alternatively, hose 1 and parts 6, 7 and 8 can be moved axially until hose end section 2 abuts against a housing onto which the pipe 4 is attached. This housing may be, for example, a radiator of an internal combustion engine of an automotive vehicle. Clip 8 can now be radially removed from the tensioning jaws 14, 15. To assist in removing clip 8, tongue 11 may be grasped with, for example, pliers. Once clip 8 is removed, hose clamp 6 relaxes and contracts radially into the position illustrated in FIG. 3. Thus, end section 2 of hose 1 is now firmly clamped onto the end section 3 of pipe 4. Alternatively, after having been tensioned by means of clip 8, hose clamp 6 can be glued to securing ring 7, by applying an adhesive between these two parts in the manner described above. Securing ring 7 can then be glued to hose 1 before the hose, together with the parts 6, 7 and 8 are fitted onto the end section 3 and before clip 8 is removed.

In the preassembled state, hose clamp 6 is securely held axially on hose 1, both during transportation and fitting of the hose 1 onto the end section 3 of pipe 4. Thus, clamp 6 does not tilt on the hose 1 or become separated from the hose and retains its position, in a plane perpendicular to the longitudinal axis of the hose 1 and of pipe 4, even after removal of clip 8. After removal of the clip 8, hose clamp 6 lies firmly and uniformly over its whole periphery on the end section 2 of the hose 1, so that clamp 6 uniformly clamps hose 1 onto the periphery of end section 3 of pipe 4 in a fluid-tight manner.

When the ambient temperature rises above approximately 80° C., as is the case with a cooling water hose located in the proximity of an internal combustion engine, the adhesive melts, so that the joint between the securing ring 7 and the hose 1 as well as the joint between the securing ring 7 and the hose clamp 6 are released. Nevertheless, despite the loss of the adhesive connection, the hose clamp 6 and the securing ring 7 retain their position on hose 1. In particular, the securing ring 7 does not separate from the hose 1, for example, by falling into the engine compartment of the automotive vehicle. This is true even if ring 7 is displaced axially on pipe 4 when a shoulder 26 or a corresponding housing is not provided. Thus, it is now possible to easily change one or more of the parts (i.e., the hose, clamp or ring) in case of damage.

it would also be possible to glue the area 19 of the hose clamp 6 to the end section 2 of the hose 1, additionally or alternatively to the gluing of the securing ring 7 to the hose 1. Additionally, these parts can be connected by vulcanization instead of gluing. However, gluing of the hose clamp 6 onto the securing ring 7 and gluing of the securing ring 7 onto the hose 1, has the advantage that this type of joint is very simple to produce and to disengage after the joint is released. Additionally, the risk of damage to an anti-corrosion coating, that is normally provided on the hose clamp, is largely avoided by using an adhesive joint.

Another embodiment of the device according to the present invention is illustrated in FIG. 6. This embodiment differs from the device shown in FIGS. 1 to 5, in that the securing pan 22 engages in at least one longitudinal slit 18 of the hose clamp 6. Part 22 engages slit 18 with a radially inwardly extending projection 27.

Figure 7:
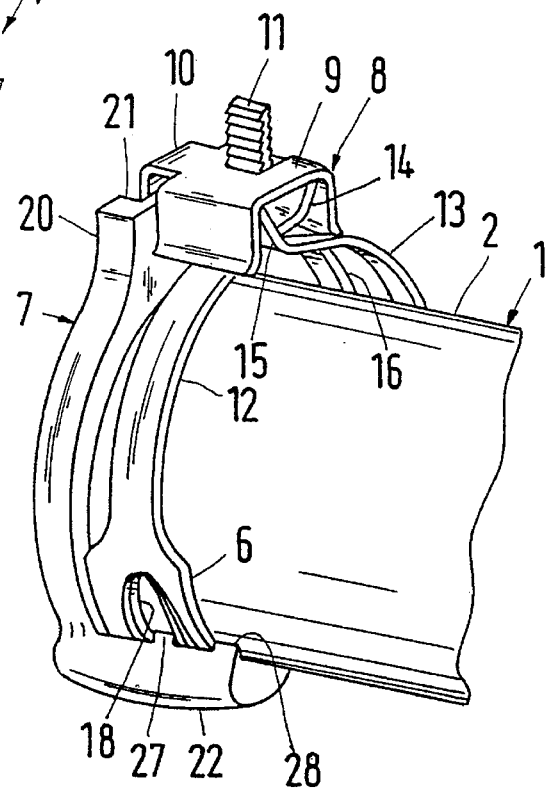

Another embodiment of the device according to the present invention is illustrated in FIG. 7. This embodiment differs from that according to FIG. 6 in that the securing part 22 is axially longer and grasps behind the hose clamp 6 with an additional radially inwardly protruding projection 28.

Instead of glueing the hose clamp 6 and securing ring 7 according to FIGS. 6 and 7, they can also be joined together only in an interlocking manner by one or both of the projections 27 and 28.

Figure 8:
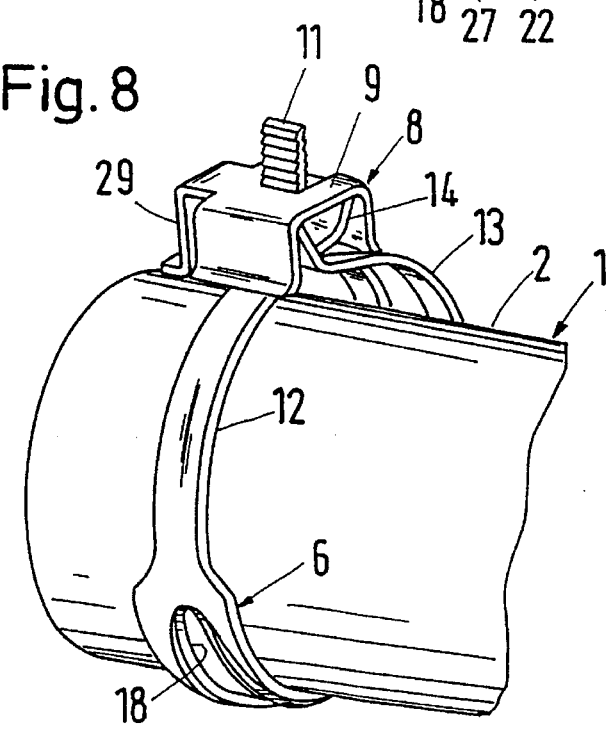

Another embodiment of the device according to the present invention is illustrated in FIG. 8. This embodiment differs from the embodiments illustrated in FIGS. 1–7 in that the securing ring 7 is omitted and the hose clamp 6 is glued or molded-on by vulcanization to the hose 1 in an area that is disposed diametrically opposite to the area of overlap of extensions 12, 13. Preferably, however, clamp 6 is glued to the hose with a cyanoacrylate adhesive. A further modification is that the clip 8 is provided with a supporting arm 29 on at least one of the edges of the cross-piece 9. Cross-piece 9 extends in the peripheral direction of the hose clamp and supporting arm 29 is disposed on a peripherally extending edge of the cross-piece 9 that is located on the free end side of the hose 1. When the hose clamp 6 is tensioned, supporting arm 29 rests on the hose 1. Additionally, when hose clamp 6 is tensioned, clip 8 is preferably joined in a materially locked manner to the hose 1. The materially locking joint can be effected by means of an adhesive which melts at a temperature above its hardening temperature. This adhesive is preferably a cyanoacrylate adhesive. The device according to FIG. 8 requires less material because of the omission of securing ring 7, but otherwise, largely has the same advantages.

Having described the presently preferred exemplary embodiment of a device for clamping a hose end section that is fitted onto a pipe end section in accordance with the present invention, it is believed that other modifications, variations and changes w ill be suggested to those skilled in the art in view of the teachings set forth herein. It is, therefore, to be understood that all such modifications, variations, and changes are believed to fall within the scope of the present invention as defined by the appended claims.

What is claimed:

1. A device for clamping a hose end section that is fitted onto a pipe end section, said device comprising:

a hose clamp surrounding a hose end section, the internal diameter of the clamp in a non-tensioned state being smaller than an internal diameter of the clamp in a tensioned state and smaller than an external diameter of the hose, said hose clamp having overlapping end sections, each of said end sections having an approximately radially outwardly extending tensioning jaw;

a securing ring being fixed to said hose end section, said securing ring having a radial projection, said securing ring surrounding said hose end section and being disposed between said hose end and said hose clamp, said securing ring being joined to said hose clamp in an area diametrically opposite to said area of overlap of said end sections of said hose clamp, said securing ring having a recess disposed in a radial projection; and an approximately U-shaped clip having a cross-piece and a pair of legs depending from said cross-piece, said U-shaped clip being disposed such that, in said tensioned state, said legs of said clip overlap said tensioning jaws of each of said end sections, said U-shaped clip having a hook depending from said cross-piece and being radially engaged in said recess.

2. The device according to claim 1, wherein said joint between said securing ring and said hose clamp in said area diametrically opposite to said area of overlap is releasable.

3. The device according to claim 2, wherein said releasable joint is effected by an adhesive which melts at a temperature above its hardening temperature.

4. The device according to claim 3, wherein said adhesive is a cyanoacrylate adhesive.

5. The device according to claim 2, wherein said securing ring overlaps said hose clamp in said area diametrically opposite said area of overlap with an axial securing part, said releasable joint being disposed between said axial securing part and said hose clamp.

6. The device according to claim 5, wherein said axial securing part engages in at least one longitudinal slit disposed in said hose clamp.

7. The device according to claim 5, wherein said axial securing part grips said hose clamp with a radially extending projection on an axial end of said hose clamp that is disposed opposite to said hose end.

8. The device according to claim 7, wherein said securing ring includes a radially inwardly projecting flange that is joined to an axial end face of said hose end section in a materially locked manner.

9. The device according to claim 1, wherein said securing ring is made from an elastomer material.

10. The device according to claim 1, wherein said securing ring is fixed to said hose end section in a materially locked manner.

11. A device for clamping a hose end section that is fitted onto a pipe end section, said device comprising:

a hose clamp surrounding said hose end section, said internal diameter of said clamp in a non-tensioned state being smaller than an internal diameter of the clamp in a tensioned state and smaller than an external diameter of said hose, said hose clamp having overlapping end sections, each of said end sections having an approximately radially outwardly extending tensioning jaw, said hose clamp being fixed to said hose in an area diametrically opposite to said area of overlap of said end sections of said hose clamp; and an approximately U-shaped clip having a cross-piece and a pair of legs depending from said cross-piece, said U-shaped clip being disposed such that, in said tensioned state, said legs of said clip overlap said tensioning jaws of each of a end sections, said cross-piece having an edge extending in said peripheral direction of a hose clamp, said edge being disposed on said free end side of said cross-piece and having a supporting arm depending from said edge such that, in said tensioned state said supporting arm rests on said hose.

12. The device according to claim 11, wherein, in said tensioned state, said supporting arm is joined in a materially locked manner to said hose.

13. The device according to claim 12, wherein said hose clamp is joined to said hose in a materially locked manner, said materially locked joints are effected by an adhesive which melts at a temperature above its hardening temperature.

14. The device according to claim 13, wherein said adhesive is a cyanoacrylate adhesive.

* * * * *